United States Patent
Honda et al.

(10) Patent No.: US 10,589,222 B2
(45) Date of Patent: Mar. 17, 2020

(54) UREA WATER AGITATION CONTROL DEVICE

(71) Applicant: DENSO CORPORATION, Kariya, Aichi-pref. (JP)

(72) Inventors: Daisuke Honda, Kariya (JP); Taiyo Hiroi, Kariya (JP); Jun Suzuki, Kariya (JP); Shunsuke Murakami, Kariya (JP); Saki Okamoto, Inabe (JP)

(73) Assignee: DENSO CORPORATION, Kariya (JP)

( * ) Notice: Subject to any disclaimer, the term of this patent is extended or adjusted under 35 U.S.C. 154(b) by 202 days.

(21) Appl. No.: 15/802,833

(22) Filed: Nov. 3, 2017

(65) Prior Publication Data

US 2018/0178162 A1 Jun. 28, 2018

(30) Foreign Application Priority Data

Dec. 22, 2016 (JP) .................. 2016-249619

(51) Int. Cl.
| | |
|---|---|
| *B01D 53/34* | (2006.01) |
| *B01D 53/94* | (2006.01) |
| *C10G 70/00* | (2006.01) |
| *F01N 3/20* | (2006.01) |

(Continued)

(52) U.S. Cl.
CPC .......... *B01D 53/346* (2013.01); *B01D 53/92* (2013.01); *C10G 70/00* (2013.01); *F01N 3/208* (2013.01); *F01N 9/00* (2013.01); *B01D 53/9431* (2013.01); *B01D 2251/2067* (2013.01); *F01N 2240/10* (2013.01); *F01N 2240/16* (2013.01); *F01N 2560/06* (2013.01); *F01N 2610/02* (2013.01); *F01N 2610/10* (2013.01); *F01N 2610/144* (2013.01); *F01N 2610/1406* (2013.01); *F01N 2610/146* (2013.01); *F01N 2610/1486* (2013.01); *F01N 2900/0602* (2013.01); *F01N 2900/08* (2013.01); *F01N 2900/12* (2013.01);

(Continued)

(58) Field of Classification Search
CPC .. B01D 53/346; B01D 53/92; B01D 53/9431; B01D 2251/2067; C10G 70/00; F01N 3/208; F01N 9/00; F01N 2240/10; F01N 2240/16; F01N 2560/06; F01N 2610/02; F01N 2610/10; F01N 2610/1406; F01N 2610/144; F01N 2610/146; F01N 2610/1486; F01N 2900/0602; F01N 2900/08; F01N 2900/12; F01N 2900/1811; F01N 2900/1818; Y02T 10/47
USPC .......................... 60/274, 286, 295, 299–301
See application file for complete search history.

(56) References Cited

U.S. PATENT DOCUMENTS

| | | | |
|---|---|---|---|
| 8,959,890 B2 * | 2/2015 | Minezawa | .............. F01N 3/208 |
| | | | 60/277 |
| 9,222,391 B2 * | 12/2015 | Ikeda | ..................... F01N 3/2046 |
| 9,582,013 B2 * | 2/2017 | Naydenov | ............... F01N 3/208 |

(Continued)

FOREIGN PATENT DOCUMENTS

JP        2008-286096        11/2008

*Primary Examiner* — Patrick D Maines
*Assistant Examiner* — Dapinder Singh
(74) *Attorney, Agent, or Firm* — Nixon & Vanderhye PC

(57) ABSTRACT

A urea water agitation control device has an agitation control portion and a temperature sensor which detects a temperature of a urea water. The agitation control portion operates an agitation portion in a specified period which includes a part of a period in which the urea water temperature detected by the temperature sensor is kept at a eutectic point and the urea water radiates a latent heat of solidification.

16 Claims, 5 Drawing Sheets

(51) Int. Cl.
*F01N 9/00* (2006.01)
*B01D 53/92* (2006.01)

(52) U.S. Cl.
CPC .............. *F01N 2900/1811* (2013.01); *F01N 2900/1818* (2013.01); *Y02T 10/47* (2013.01)

(56) References Cited

U.S. PATENT DOCUMENTS

2014/0290221 A1   10/2014   Yoshida et al.
2015/0089926 A1*  4/2015   Ikeda .................. F01N 3/2046
                                                            60/277

\* cited by examiner

UREA WATER AGITATION CONTROL DEVICE

CROSS-REFERENCE TO RELATED APPLICATION

This application is based on Japanese Patent Application No. 2016-249619 filed on Dec. 22, 2016, the disclosure of which is incorporated herein by reference.

TECHNICAL FIELD

The present disclosure relates to a urea water agitation control device which agitates a urea water stored in a storage tank.

BACKGROUND

A urea water is added to an upstream portion of an exhaust gas purifying device in an exhaust pipe to purify an exhaust gas emitted from an internal combustion engine. In a case where a concentration of the added urea water is lower than a proper concentration range, urea amount supplied to the exhaust gas becomes insufficient, which deteriorates an exhaust gas purification rate. In a case where the concentration of the added urea water is higher than the proper concentration range, an excessive amount of the urea is supplied to the exhaust gas, so that the urea which has not been reacted to the exhaust gas is discharged to atmosphere. Thus, the concentration of the urea water is necessary to be within the proper concentration range.

In a cold district, the urea water may solidify. Generally, there is a difference between a freezing point of water which is a solvent of the urea water and a freezing point of urea which is a solute of the urea water. Thus, the solvent and the solute start solidifying at different temperatures. Moreover, the freezing points of the solvent and the solute depend on the urea concentration. Since the specific gravity of solidified water is smaller than that of liquid-phase water, the solidified water flows up to a water surface of the water solution. Meanwhile, since the specific gravity of urea is larger than that of the water, the urea flows down to the bottom of the water solution. Thus, when the urea water starts solidifying, a concentration separation will occur.

When the engine is started with the urea water solidified, a part of the solidified urea water is thawed to be added into an exhaust pipe. In such a case, the thawed urea water also has the concentration separation. In order to avoid the concentration separation, 32.5% urea water has been used, as described in JP 2008-286096 A. 32.5% urea water has a eutectic point at −11° C. The eutectic point is a temperature at which urea and water solidify (crystalize) simultaneously. Therefore, it has been considered that 32.5% urea water has no concentration separation when solidifies.

However, from when the urea water starts solidifying until when all of the urea water in the storage tank totally solidifies to be in solid phase, the solid urea, the solid water and the water solution exist in the storage tank. According to the present inventors' study, it becomes apparent as follows. That is, due to a difference in specific gravity between the urea and the solidified water, the solidified water flows up to a water surface of the water solution, and the urea flows down to a bottom of the water solution. Thus, a concentration separation occurs in a perpendicular direction.

It is an object of the present disclosure to provide a urea water agitation control device which can restrict a solidification of the urea water with a concentration separation.

According to one aspect of the present disclosure, a urea water agitation control device has an agitation control portion which controls an agitation portion agitating the urea water stored in a storage tank, and a temperature sensor which detects a temperature of the urea water. The agitation control portion operates the agitation portion in a specified period which includes at least a part of a period in which the urea water temperature detected by the temperature sensor is kept at a eutectic point and the urea water radiates a latent heat of solidification.

The urea water is agitated in the specified period which includes at least a part of a period in which the urea water temperature detected by the urea water temperature sensor is kept at the eutectic point and the urea water radiates heat. Therefore, it can be restricted that solidified water and solidified urea are separately located at the water surface and the water bottom. It can be restricted that the urea water solidifies with a distribution of the concentration thereof (concentration separation).

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
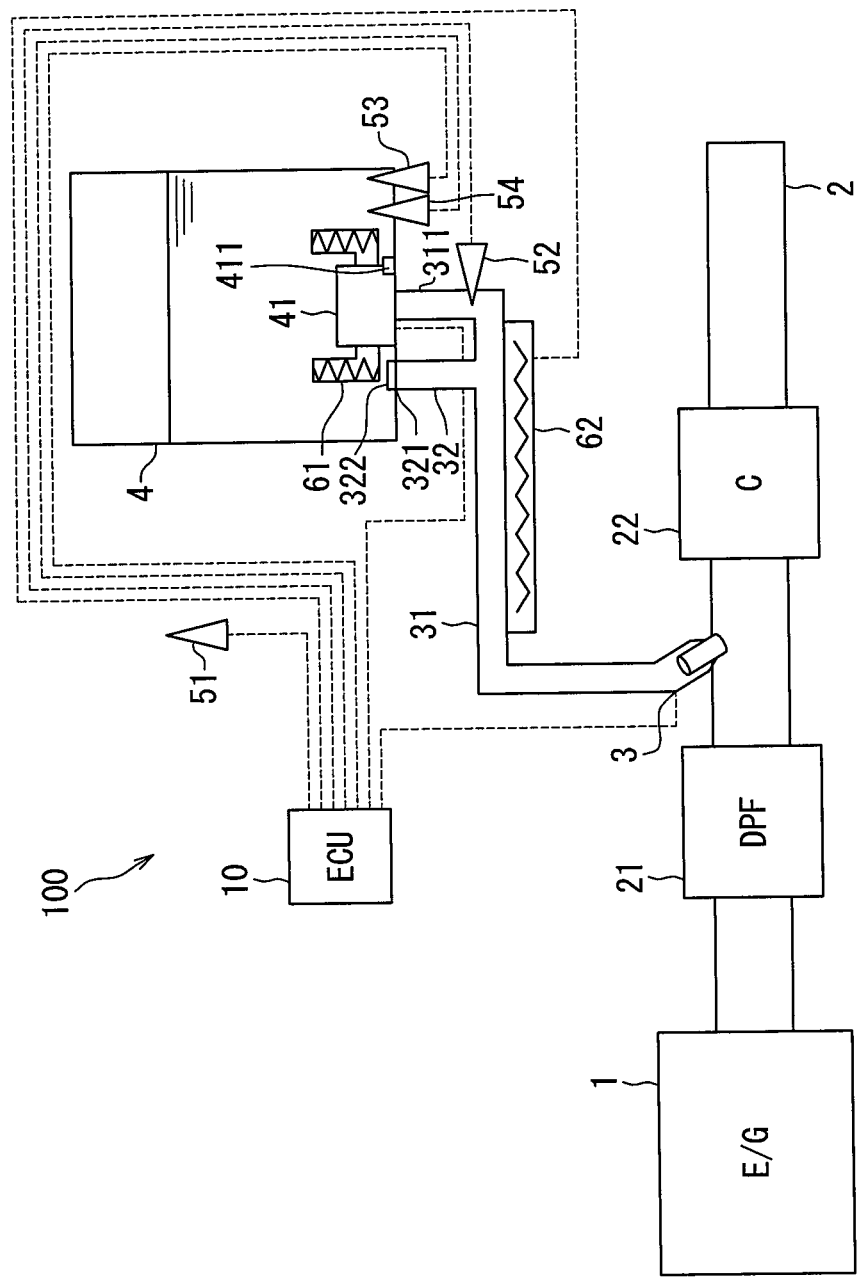
FIG. 1 is a schematic diagram showing an exhaust gas purifying device to which a urea water agitation control device is applied, according to a first embodiment.

Referring to drawings, embodiments of the present invention will be described hereinafter. In these embodiments, the same parts and components as those in each embodiment are indicated with the same reference numerals and the same descriptions will not be reiterated.

First Embodiment

As shown in FIG. 1, a urea water agitation system is applied to an exhaust gas purifying system 100 of an internal combustion engine which is mounted on a vehicle. The internal combustion engine is a diesel engine 1. The urea water agitation system is provided with an agitation portion which agitates the urea water and a urea water agitation control device which controls the agitation portion.

An exhaust gas emitted from the engine 1 is discharged into an exhaust pipe 2. A diesel particulate filter (DPF) 21 is arranged at upstream portion in the exhaust pipe 2. An injection valve 3 is provided downstream of the DPF 21, and a catalyst device 22 is provided downstream of the injection valve 3. The catalyst device 22 includes a selective catalytic reduction (SCR).

The DPF 21 captures particulate matters (PM) contained in the exhaust gas. The catalyst device 22 selectively performs a reduction purifying of NOx along with a reducing agent supplied from the injection valve 3.

In the present embodiment, the reducing agent supplied to the catalyst device 22 is urea which is precursor of ammonia. The urea water is stored in a storage tank 4. The urea water is fed to the injection valve 3 through a urea water supply pipe 31 by a urea water pump 41 which is disposed in the storage tank 4.

The injection valve 3 has a nozzle hole (not shown) through which the urea water is atomized and injected into the exhaust pipe 2. The injection valve 3 is provided to the exhaust pipe 2 in such a manner that the nozzle hole is positioned in an exhaust gas flowing through the exhaust pipe 2. The injection valve 3 is an electromagnetic valve which is provided with an electromagnetic solenoid and a needle for opening and closing the nozzle hole. When the electromagnetic solenoid is energized, the needle is moved to open the nozzle holes so that the urea water is injected into an interior of the exhaust pipe 2.

The urea water pump 41, a tank heater 61, a urea water temperature sensor 53 and a urea water concentration sensor 54 are disposed in the storage tank 4. The storage tank 4 has an outlet port 311 and a return port 321. The urea water supply pipe 31 is fluidly connected to the outlet port 311. One end of a return pipe 32 is fluidly connected to the return port 321. The other end of the return pipe 32 is fluidly connected to the urea water supply pipe 31 between the urea water pump 41 and the injection valve 3. A return valve 322 is provided to the return port 321 for opening and closing the return port 321. The return valve 322 is an electromagnetic valve which opens when energized.

The tank heater 61 heats the urea water when it is determined that the urea water is solidified based on detected values of the urea water temperature sensor 53. The urea water temperature sensor 53 detects temperature of urea water in the storage tank 4. The urea water concentration sensor 54 detects concentration of the urea water in the storage tank 4.

The urea water pump 41 has an electric motor, an impeller and a suction port 411 for suctioning the urea water. The urea water pump 41 is a non-positive displacement type pump which suctions and feeds the urea water by the impeller. The suction port 411 is arranged at a position close to a bottom surface of the storage tank 4.

The impeller of the urea water pump 41 can perform a positive rotation and a reverse rotation. When the impeller performs a positive rotation, the urea water in the storage tank 4 is fed to the urea water supply pipe 31 through the suction port 411. When the impeller performs a reverse rotation, the urea water in the urea water supply pipe 31 is returned to the storage tank 4 through the suction port 411. That is, the urea water is suctioned into the storage tank 4. When the impeller of the urea water pump 41 further performs the reverse rotation after all of the urea water in the urea water supply pipe 31 is returned to the storage tank 4, an air in the urea water supply pipe 31 can be suctioned into the storage tank 4. That is, the urea water pump 41 discharges the air as bubbles into the urea water in the storage tank 4 through the suction port 411 by rotating the impeller in the reverse direction. Since the suction port 411 is formed close to a bottom surface of the storage tank 4, the discharged bubbles flow up from the bottom surface of the storage tank 4 toward a water surface of the urea water in the storage tank 4. Thereby, a bubble flow is generated from the bottom to the top of the urea water stored in the storage tank 4. The urea water in the storage tank 4 is agitated by the bubbles discharged from the urea water pump 41. That is, when the impeller is rotated in the reverse direction, the urea water pump 41 functions as the agitation portion.

The urea water supply pipe 31 is provided with a urea water pressure sensor 52 which detects the urea water pressure in the urea water supply pipe 31. When the urea water pressure exceeds a specified pressure, an electronic control unit (ECU) 10 energizes the return valve 322 to open the return port 321. Thus, a part of urea water flowing through the urea water supply pipe 31 is returned to the storage tank 4 through the return pipe 32. The urea water supply pipe 31 is provided with a pipe heater 62 which heats the urea water flowing through the urea water supply pipe 31.

Moreover, the exhaust gas purifying system 100 has an ambient temperature sensor 51 which detects an ambient temperature TAM.

The ECU 10 is a microcomputer which has a central processing unit (CPU), a memory device (MMR), an input circuit, and an output circuit.

32.5% urea water as the reducing agent has a eutectic point EUT at −11° C. 32.5% urea water is a urea water of which 32.5% is urea component (urea) and 67.5% is water. The eutectic point EUT represents a temperature at which urea and water solidify (crystalize) at the same time. It has been considered that a concentration separation does not occur in the 32.5% urea water when the 32.5% urea water solidifies because the urea and the water solidify at the eutectic point EUT at the same time. However, until all of the urea water in the storage tank 4 totally solidifies to be solid-state, the solid urea, the solid water and the water solution exist in the storage tank 4. Since a specific gravity of water in solid phase is smaller than that in liquid phase, the solidified water moves upwardly toward the water surface of the water solution. Meanwhile, since a specific gravity of urea in solid phase is larger than that of the water solution, the crystalized urea moves downwardly toward a bottom of the container tank 4. Even if the urea and the water solidify at the eutectic point EUT, the solidified water moves upwardly in the water solution and the crystalized urea moves downwardly in the water solution during a period in which the solid urea, the solid water and the water solution exist in the storage tank 4. Thus, even if the urea and the water start solidifying (crystalizing) at the eutectic point EUT, a concentration separation occurs in a perpendicular direction due to a difference in specific gravity between the solidified urea and the solidified water.

Figure 2:
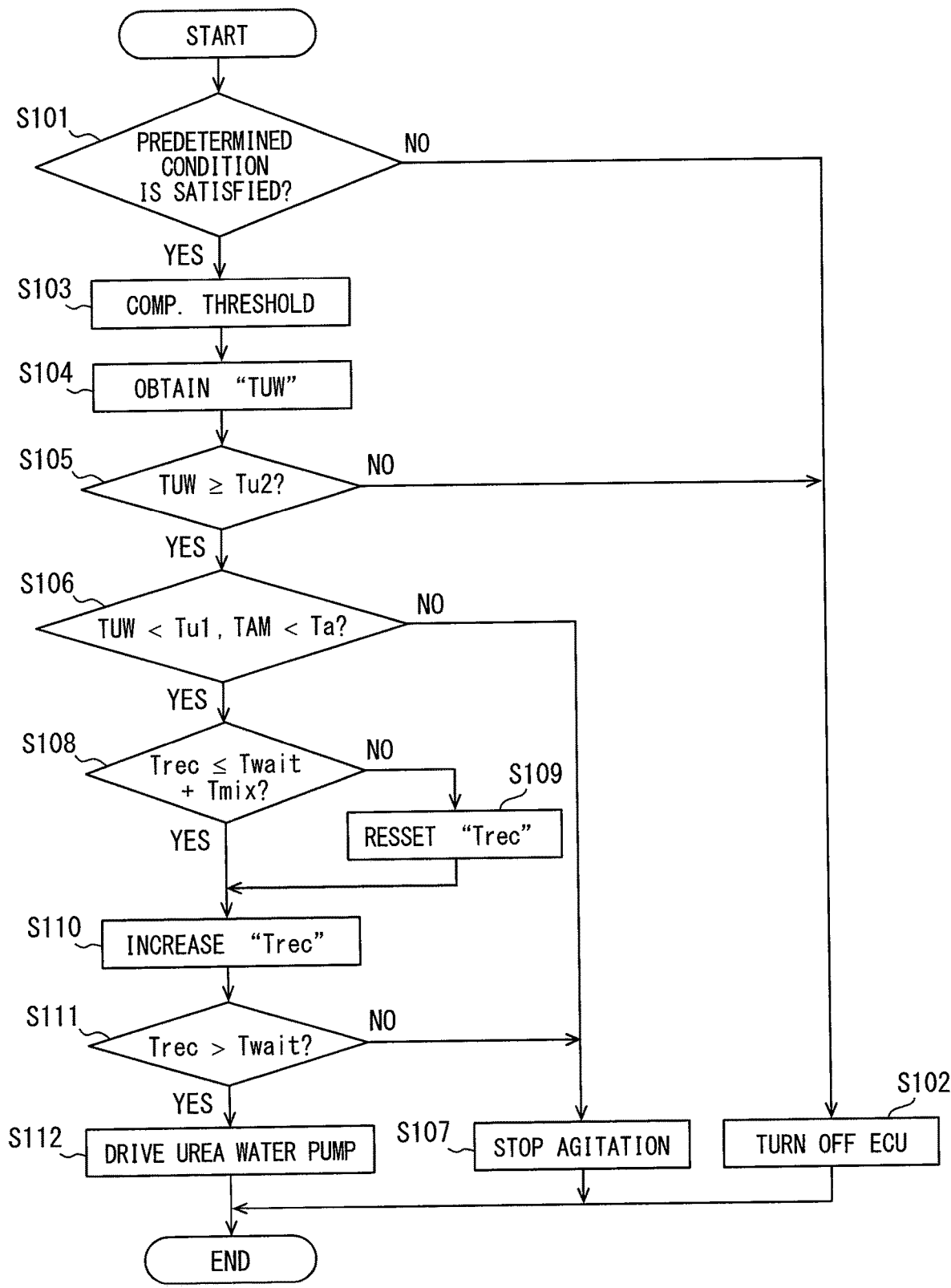
FIG. 2 is a flowchart showing an agitation control of a urea water by a urea water agitation control device, according to the first embodiment.

According to the present embodiment, the urea water agitation control device executes a processing shown in FIG. 2 to control the urea water pump 41. Thereby, it can be restricted that all of the urea water in the storage tank 4 solidifies in a condition where a concentration separation occurs in a perpendicular direction. The control flow shown in FIG. 2 will be described in detail, hereinafter. In the following description, an operation of the urea water pump 41 represents the reverse rotation of the impeller. That is, the urea water pump 41 functions as the agitation portion.

An execution of the control flow shown in FIG. 2 is started when the urea water radiates latent heat of solidification and the engine 1 is stopped. That is, the control flow shown in FIG. 2 is executed when the ECU 10 is energized with the engine 1 stopped. It should be noted that the urea water radiates the latent heat of solidification when the urea water temperature detected by the urea water temperature sensor 53 is higher than the ambient temperature TAM detected by the ambient temperature sensor 51. The agitation of the urea water is conducted by the urea water pump 41. The urea water pump 41 is operated based on a signal transmitted from an agitation control portion in a specified period which includes a part of a period in which the urea water temperature detected by the urea water temperature sensor 53 is kept at the eutectic point EUT and the urea water radiates the latent heat of solidification. Furthermore, the agitation control portion operates the urea water pump 41 during the specified period, and then stops the urea water pump 41 during a certain period. The urea water pump 41 is operated intermittently in an intermittent driving mode. The procedure shown in FIG. 2 is repeatedly executed until the ECU 10 is turned off.

In step S101, it is determined whether a predetermined condition is satisfied. Specifically, it is determined whether a charge residue of a battery mounted on a vehicle is greater than a specified value. Also, it is determined whether an amount of the urea water stored in the storage tank 4 is greater than a specified amount. When the answer is YES in step S101, the procedure proceeds to step S103. When the answer is NO in step S101, the procedure proceeds to step S102. In step S102, the ECU 10 is turned off. That is, when the charge residue of the battery is not greater than the specified value, or when the stored urea water amount is not greater than the specified amount, the agitation of the urea water by the agitation portion is prohibited.

In step S103, a threshold computing portion computes each determination threshold. Specifically, the threshold computing portion computes a first threshold temperature Tu1 at which the agitation of the urea water is started. Since the ambient temperature TAM at which the urea water starts its solidification varies according to the urea water concentration, the ambient temperature TAM at which the urea water starts its solidification is calculated as an ambient temperature threshold Ta. Furthermore, the threshold computing portion computes an operation period threshold Tmix and a stop period threshold Twait for determining an operation period and a stop period of the urea water pump 41 in the intermittent drive mode.

The first threshold temperature Tu1 is computed based on the detected value of the urea water concentration sensor 54 disposed in the storage tank 4. When the urea water concentration slightly deviates from 32.5%, the temperature at which the urea water starts its solidification may become higher than $-11°$ C. of eutectic point EUT. Therefore, it is necessary to compute the first threshold temperature Tu1 according to the urea water concentration. A correlation map showing a correlation between the temperature at which the urea water starts its solidification and the urea water concentration is obtained in advance by experiments. The correlation map is stored in the memory. In view of the correlation map, based on the detected value of the urea water concentration sensor 54, the temperature at which the urea water starts its solidification is estimated. The first threshold temperature Tu1 is higher than the estimated temperature at which the urea water starts its solidification. That is, the agitation of the urea water is started while the urea water temperature TUW is falling from a specified temperature Tu1 to the eutectic point EUT.

The ambient temperature threshold Ta is computed based on the detected value of the urea water density sensor 54. A correlation map showing a correlation between the ambient temperature TAM at which the urea water starts its solidification and the urea water concentration is obtained in advance by experiments. The correlation map is stored in the memory. Based on the detected value of the urea water concentration sensor 54 and the correlation map, the ambient temperature TAM at which the urea water of the detected concentration starts its solidification is computed as the ambient temperature threshold Ta.

The operation period threshold Tmix and the stop period threshold Twait are computed based on the detected value of the ambient temperature sensor 51. Specifically, the operation period threshold Tmix and the stop period threshold Twait are computed in view of a correlation map which is obtained in advance by experiments. The correlation map shows a correlation between the ambient temperature TAM and a ratio of an operation period to a stop period of the urea water pump 41. The stop period is necessary for all of the urea water to solidify without concentration separation. As the ambient temperature TAM is lower, the ratio of the operation period to the stop period of the urea water pump 41 becomes larger. That is, as the ambient temperature TAM is lower, the operation period of the urea water pump 41 is longer. The correlation map is stored in the memory in advance. When each determination threshold has been computed by the threshold computing portion, the procedure proceeds to step S104.

In step S104, the ECU 10 obtains the urea water temperature TUW detected by the urea water temperature sensor 53.

In step S105, it is determined whether the obtained urea water temperature TUW is higher than a second threshold temperature Tu2. The second threshold temperature Tu2 is lower than the eutectic point EUT. For example, the second threshold temperature Tu2 is $-13°$ C. When it is determined that the urea water temperature TUW is less than the second threshold temperature Tu2 (S105: NO), it is assumed that all of the urea water has solidified. The procedure proceeds to step S102. When it is determined that the urea water temperature TUW is not less than the second threshold temperature Tu2 (S105: YES), it is assumed that all of the urea water has not solidified. That is, it is assumed that the urea water is in a liquid-solid phase or a liquid phase. The procedure proceeds to step S106.

In step S106, it is determined whether an agitation requirement is generated. Specifically, it is determined whether the urea water temperature TUW is less than the first threshold temperature Tu1 and the ambient temperature TAM is less than the ambient temperature threshold Ta. When the answer is YES in step S106, it is determined that the agitation requirement is generated. Then, the procedure proceeds to step S108. When the answer is NO in step S106, it is determined that no agitation requirement is generated. Then, the procedure proceeds to step S107 in which the agitation control portion stops the agitation operation of the urea water pump 41.

The ECU 10 measures an elapsed time since the agitation requirement is generated by means of a timer. The measured elapsed time is stored in the memory as a stored time Trec. In step S108, it is determined whether the stored time Trec is less than or equal to a total time of the operation period threshold Tmix and the stop period threshold Twait. When it is determined that the stored time Trec is greater than the total time (S108: NO), the procedure proceeds to step S109 in which the stored time Trec is reset to "0". When it is determined that the stored time Trec is not greater than the total time (S108: YES), the procedure proceeds to step S110. In step S110, the stored time Trec is increased by a specified time.

In step S111, it is determined whether the stored time Trec is greater than the stop period threshold Twait. When the answer is YES in step S111, the procedure proceeds to step S112. When the answer is NO in step S111, the procedure proceeds to step S107 in which the agitation control portion stops the operation of the urea water pump 41.

In step S112, the agitation control portion energizes the urea water pump 41. When all of the urea water has not solidified, the impeller of the urea water pump 41 is rotated in the reverse direction. Then, the urea water pump 41 suctions the air in the urea water supply pipe 31. The suctioned air is discharged into the storage tank 4 through the suction port 411. The discharged air flows up from the bottom surface of the storage tank 4 toward the water surface of the urea water. Thereby, the perpendicular flow of the urea water is generated, so that the urea water in the storage tank 4 is agitated.

When it is determined that all of the urea water has solidified in step S105, the procedure proceeds to step S102 in which the ECU 10 is turned off.

Figure 3:
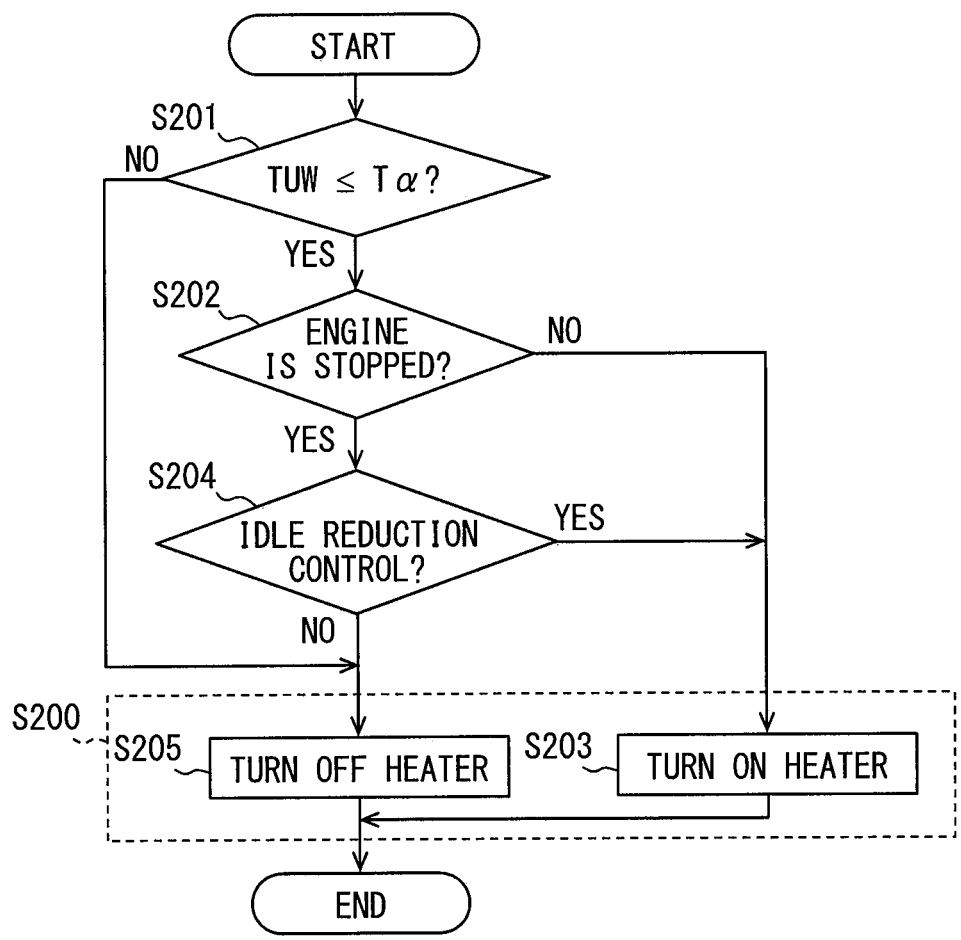
FIG. 3 is a flowchart showing a control of a tank heater and a pipe heater, according to the first embodiment.

As described above, the control flow shown in FIG. 2 is executed from when the engine 1 is stopped until when all of the urea water solidifies. Also, a heater control shown in FIG. 3 is repeatedly executed while the ECU 10 is energized. In the heater control, the tank heater 61 and the pipe heater 62 are controlled to be energized or deenergized.

In step S201, it is determined whether the urea water temperature TUW in the storage tank 4 is less than or equal to a specified temperature Ta. The urea water temperature TUW is detected by the urea water temperature sensor 53. The specified temperature Ta is higher than the eutectic point EUT and the first threshold temperature Tu1 (for example, about −5° C.). When the answer is YES in step S201, the procedure proceeds to step S202. When the answer is NO in step S201, the procedure proceeds to step S205.

In step S202, it is determined whether the engine 1 is stopped. When the engine 1 is not stopped, the procedure proceeds to step S203. In step S203, the tank heater 61 and the pipe heater 62 are turned on.

When it is determined that the engine 1 is stopped in step S202, the procedure proceeds to step S204. In step S204, it is determined whether the engine 1 is stopped by an idle reduction control. When the engine 1 is stopped by the idle reduction control, the procedure proceeds to step S203 in which the tank heater 61 and the pipe heater 62 are turned on.

When the engine 1 is stopped not by the idle reduction control, the procedure proceeds to step S205 in which the tank heater 61 is turned off. The procedures in steps S203 and S205 correspond to a heater control portion S200.

Figure 4:
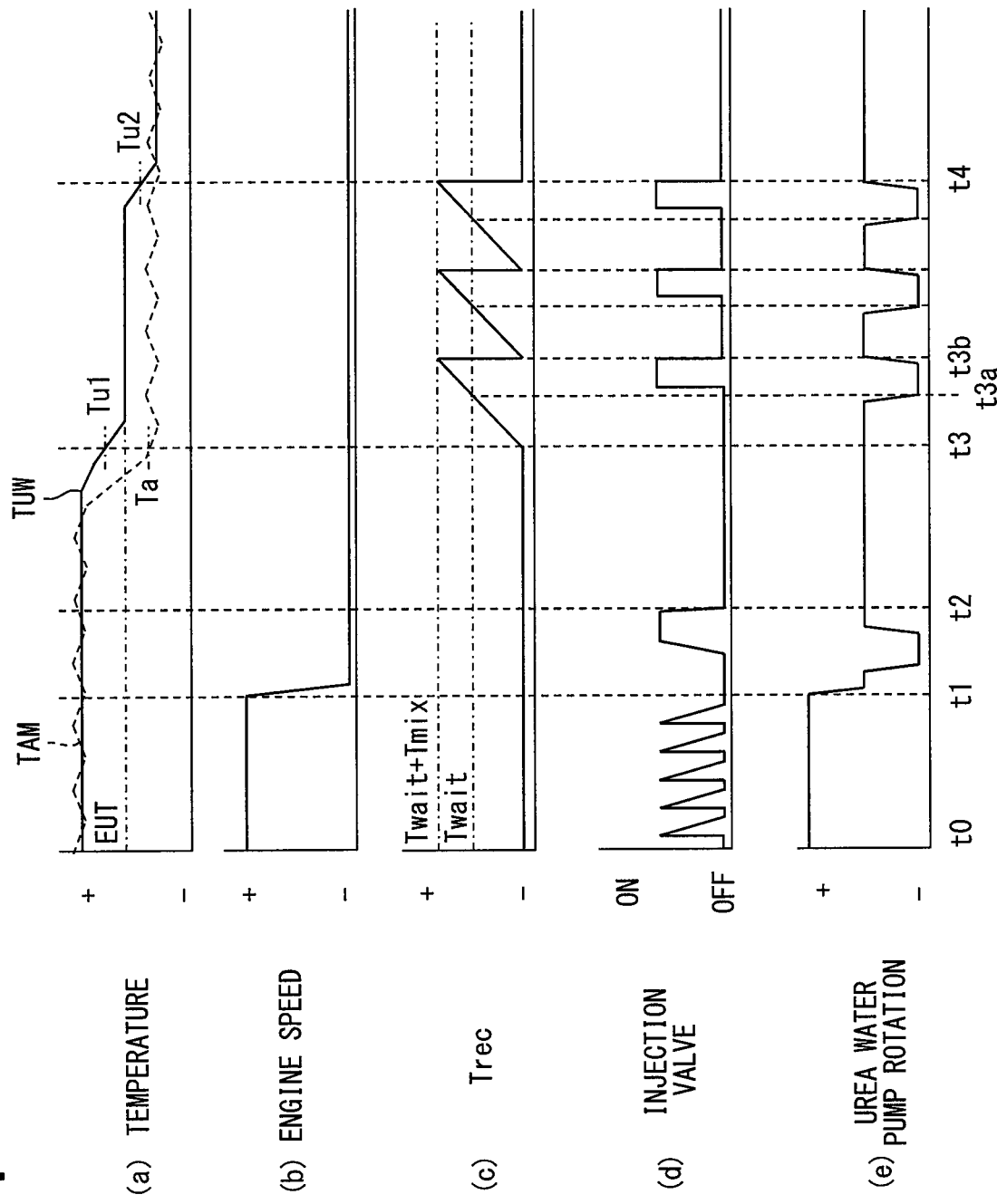
FIG. 4 is a time chart showing a urea water agitation according to the first embodiment.

The operation of the control flow shown in FIG. 2 will be described based on a time chart shown in FIG. 4. The time chart shown in FIG. 4 shows a case where the ambient temperature TAM is lower than the eutectic point EUT During a time period from a time t0 to a time t1, the engine 1 runs at a specified speed, as shown in FIG. 4(b). The injection valve 3 is intermittently energized or deenergized as shown in FIG. 4(d). The urea water pump 41 performs the positive rotation to feed the urea water to the injection valve 3, as shown in FIG. 4(e).

When an ignition switch is turned off at the time t1, the engine speed of the engine 1 becomes zero. That is, the engine 1 stops. When the engine 1 stops, the urea water in the urea water supply pipe 31 is suctioned into the storage tank 4 by operating the urea water pump 41 in the reverse direction for a specified period. The operation period of the urea water pump 41 depends on the exhaust gas purifying devices 100, and is stored in the memory in advance. When the urea water pump 41 starts rotating in the reverse direction, the injection valve 3 is closed so that a negative pressure is generated in the urea water supply pipe 31. Then, the injection valve 3 is energized to be opened; the air in the exhaust pipe 2 is suctioned into the urea water supply pipe 31. The urea water in the urea water supply pipe 31 is introduced into the storage tank 4. When all of the urea water in a urea water supply pipe 31 is introduced into the storage tank 4 at the time t2, the injection valve 3 is deenergized.

When the engine 1 is stopped at the time t1, the execution of the control flow shown in FIG. 2 is started. As shown in FIG. 4(a), when the urea water temperature TUW falls below the first threshold temperature Tu1 and the ambient temperature TAM falls below the ambient temperature threshold Ta at a time t3, it is determined that a urea-water agitation requirement is generated. Then, the timer starts measuring the elapsed time as shown in FIG. 4(c). The computer determines whether the stored time Trec is greater than the stop period threshold Twait. Between the time t3 and a time t3a, it is determined that the stored time Trec is not greater than the stop period threshold Twait. Even though the urea water agitation requirement is generated, the agitation control portion stops the urea water pump 41. Then, when it is determined that the stored time Trec is greater than the stop period threshold Twait, the urea water pump 41 is started. When the urea water pump 41 is rotated in the reverse direction, the injection valve 3 is energized to be opened. The air in the exhaust pipe 2 is suctioned into the storage tank 4 through the urea water supply pipe 31. The suctioned air is discharged into the urea water stored in the storage tank 4 through the suction port 411. The discharged air flows up from the bottom toward the water surface of the urea water. That is, the urea water in the storage tank 4 is agitated by the air bubbles.

When it is determined that the stored time Trec is greater than or equal to the total value of the operation period threshold Tmix and the stop period threshold Twait at the time tab, the urea water pump 41 is stopped. At the same time, the stored time Trec is reset to zero. The switching the urea water pump 41 between on and off is repeatedly performed until a time t4.

The intermittent agitation of the urea water is stopped at the time t4 at which the urea water temperature TUW becomes lower than the second threshold Tu2. It is assumed that all of the urea water in the storage tank 4 has solidified at the time t4 to deenergize the ECU 10. The control flow shown in FIG. 2 is terminated.

According to the present embodiment, the urea water pump 41 is operated in a specified period which includes at least a part of a period in which the urea water temperature TUW detected by the urea water temperature sensor 53 is kept at the eutectic point EUT and the urea water radiates latent heat of solidification. Therefore, it can be restricted that solidified water and crystalized urea are separately located at the water surface and the water bottom. It can be restricted that the urea water solidifies with a distribution of the concentration thereof (concentration separation).

Moreover, according to the present embodiment, the agitation control portion operates the urea water pump 41 also in a period in which the urea water temperature TUW is falling from a specified temperature Tu1 to the eutectic point EUT in addition to when the urea water temperature TUW is the eutectic point EUT. That is, before the urea water starts solidifying (crystalizing) at the eutectic point EUT, the urea water in the storage tank is agitated by the urea water pump 41. Contrary to the present embodiment, if the agitation of the urea water is not performed before the urea water starts solidifying at the eutectic point EUT, the water and the urea solidify unevenly. However, according to the present embodiment, since the agitation of the urea water is started before the water and the urea start solidifying (crystalizing), it can be restricted that the water and the urea solidify unevenly. Moreover, when the actual concentration of the urea water deviates form a proper concentration (32.5%), the urea water starts solidifying at higher temperature than −11° C. In view of the above, according to the present embodiment, since the urea water pump 41 is operated also in a period in which the urea water temperature TUW is falling from the specified temperature Tu1 to the eutectic point EUT, it can be restricted that the agitation of the urea water begins after the solidification starts.

Moreover, according to the present embodiment, the heater control portion S200 has a heater stop portion. When the urea water temperature TUW is falling from the specified temperature Ta to the eutectic point EUT with the engine stopped, the tank heater 61 and the pipe heater 62 are turned off. While the tank heater 61 and the pipe heater 62 are energized, the urea water in the storage tank 4 is heated and its solidification is restricted. Moreover, when the urea water solidifies at a starting of the engine 1, the tank heater 61 and the pipe heater 62 are energized to thaw the urea water. When the urea water temperature TUW is lower than the specified temperature Ta and the engine 1 is stopped, the tank heater 61 and the pipe heater 62 are turned off.

Moreover, when the engine 1 is stopped by the idle reduction control, the tank heater 61 and the pipe heater 62 continue to be energized. Thus, even when the engine 1 is automatically stopped by the idle reduction control immediately after the engine 1 is started under a condition where all of the urea water in the storage tank is solidified, the tank heater 61 is kept on. Therefore, it is possible to perform a thawing of the solidified urea water suitably.

Moreover, according to the present embodiment, the agitation control portion operates the urea water pump 41 by electric power supplied from a battery. Therefore, when the urea water pump 41 is operated for a long time period, the battery may go dead.

According to the present embodiment, the agitation control portion intermittently operates the urea water pump 41 in the intermittent driving mode. It should be noted that a specified time period is necessary from the urea water starts solidifying until all of the urea water solidifies. Even if the urea water pump 41 is not kept being operated during all the period from the urea water starts solidifying until all of the urea water solidifies, it can be restricted that the concentration separation of the urea water is generated. Thus, even when the agitation of the urea water is intermittently performed, it can be restricted that the concentration separation is generated when all of the urea water solidifies. Thus, an electric power consumption of the urea water pump 41 can be reduced, so that the battery down can be avoided.

Moreover, as the ambient temperature TAM is lower, the operation period of the urea water pump 41 is more prolonged. The solidification rate of the urea water is varied according to the ambient temperature TAM. For example, when the ambient temperature TAM is significantly lower than the eutectic point EUT, the solidification rate of the urea water is high. When the ambient temperature TAM is close to the eutectic point EUT, the solidification rate of the urea water is low. When the ambient temperature TAM is lower than the eutectic point EUT and the solidification rate of the urea water is high, the urea and the water are crystallized at high speed. The solidified water and the crystalized urea tend to be separately located at the water surface and the water bottom. Therefore, as the ambient temperature TAM is lower than the eutectic point EUT of the urea water, the urea water pump 41 is operated for longer time period. Even when the solidification rate of the urea water is high, it can be restricted that the solidified water and the crystalized urea are separately located when all of the urea water is solidified.

Meanwhile, when the ambient temperature TAM is close to the eutectic point EUT of the urea water and the solidification rate of the urea water is low, the urea and the water are crystallized at low speed. The urea water pump 41 is operated for shorter time period. The electric power consumption of the urea water pump 41 can be reduced. Thus, even when it takes long time period for all of the urea water to solidify, the intermittent operation of the urea water pump 41 can be conducted for a long time period. That is, the agitation of the urea water can be conducted until all of the urea water solidifies.

According to the present embodiment, the urea water pump 41 is operated in the intermittent mode over an entire period in which the urea water temperature TUW detected by the urea water temperature sensor 53 is kept at the eutectic point EUT and the urea water radiates the latten heat of solidification. The concentration separation of the urea water can be restricted. It is possible to promote concentration separation inhibition of a urea water.

Moreover, the urea water pump 41 is configured to discharge air bubbles into the urea water so as to agitate the urea water. The agitation control portion controls the operation of the urea water pump 41. The discharged air babbles flow up toward the water surface of the urea water in the storage tank 4. That is, the air bubbles flow in a perpendicular direction, which generates a perpendicular flow in the urea water. Thereby, the urea water in the storage tank 4 is agitated, and the concentration separation can be restricted.

Moreover, even if the urea water temperature TUW is below the eutectic point EUT, the agitation control portion prohibits the agitation by the urea water pump 41 when the amount of the urea water in the storage tank 4 is lower than a predetermined quantity. When the amount of the urea water is lower than the predetermined quantity, the concentration separation has less influence. In such a case, the agitation by the urea water pump 41 is prohibited. Thus, the battery down can be avoided.

Second Embodiment

Referring to a time chart shown in FIG. 5, an operation of a urea water agitation control device according to a second embodiment will be explained. The same description as the first embodiment will not be reiterated.

Figure 5:
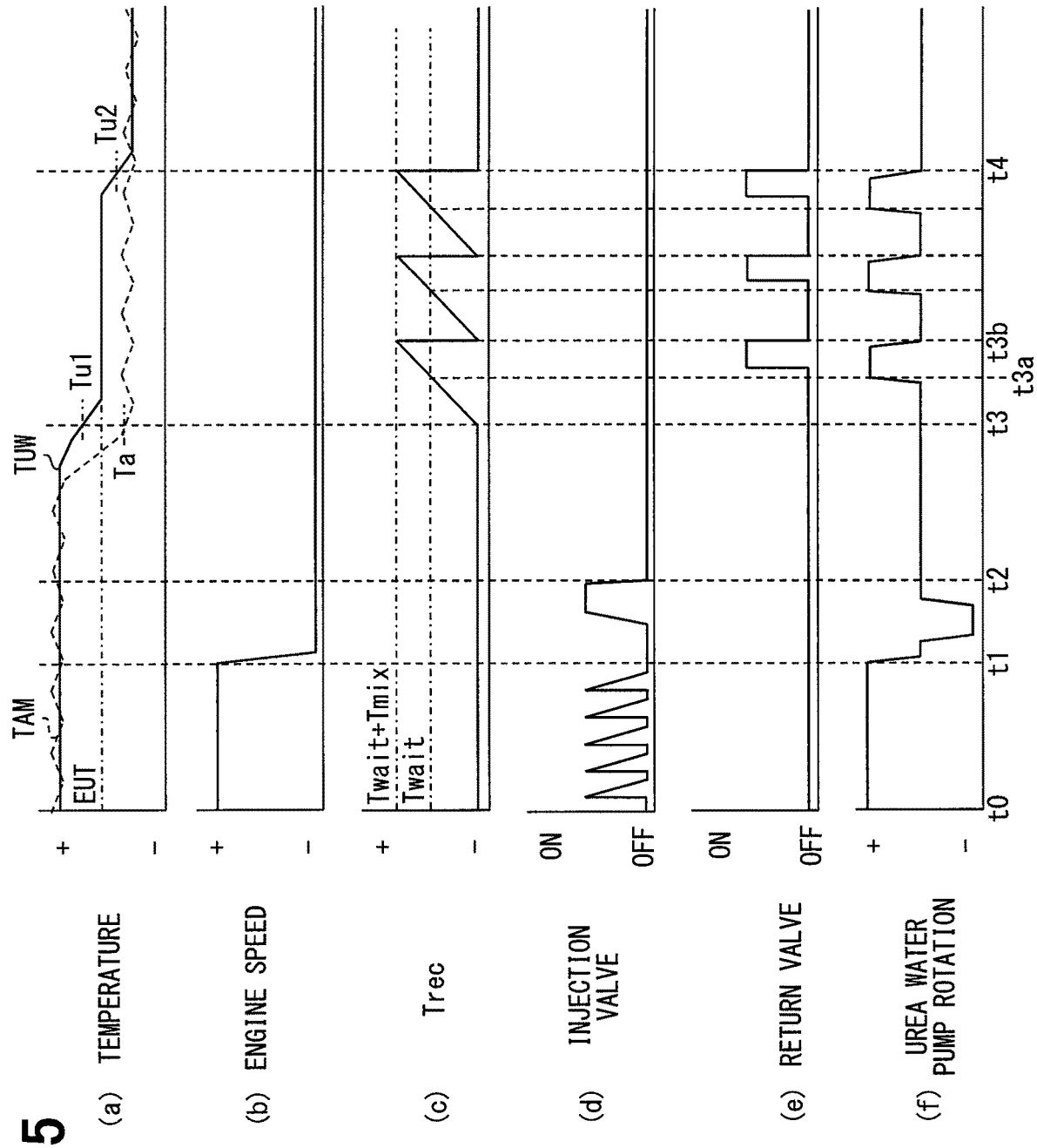
FIG. 5 is a time chart showing an agitation control of a urea water by a urea water agitation control device, according to a second embodiment.

When it is determined that the agitation requirement is generated at a time t3, the urea water pump 41 is operated in the positive direction as shown in FIG. 5(*f*). The injection valve 3 is not energized. When the urea water pump 41 starts the positive rotation at a time t3*a*, the return valve 322 is energized to open the return port 321. As shown in FIG. 5(*e*), the return valve 322 is energized after the urea water pump 41 is driven for a specified time period. When the urea water pump 41 is driven for the specified time period with the return valve 322 not opened, the pressure of the urea water in the urea water supply pipe 31 is increased. Then, the return valve 322 is opened, whereby the high pressure urea water flows into the storage tank 4. When the stored time Trec becomes greater than or equal to the total value of the operation period threshold Tmix and the stop period threshold Twait at a time t3*b*, the agitation control portion stops the urea water pump 41.

According to the present embodiment, the agitation portion includes the urea water supply pipe 31, the urea water pump 41, and the return pipe 32. The agitation control portion controls the urea water pump 41 so as to supply the urea water to the urea water supply pipe 31. The supplied urea water circulates through the urea water supply pipe 31, the return pipe 32 and the storage tank 4. The return pipe 32 corresponds to a discharge pipe. Since the urea water flows from the storage tank 4 to the storage tank 4 through the urea water supply pipe 31 and the return pipe 32, a perpendicular flow of the urea water is generated in the storage tank 4. Thus, the urea water in the storage tank 4 is agitated, so that a generation of the concentration separation can be restricted.

Another Embodiment

In the above embodiment, the return valve 322 is an electromagnetic valve which opens when energized. However, the return valve 322 may be a mechanical valve which has a spring biasing the valve body in a close direction. Specifically, the return valve 322 is a check valve which is opened when the pressure in the return pipe 32 is greater than that in the storage tank 4 by a specified value.

The urea water pump 41 can be a positive displacement pump.

The agitation control portion drives the urea water pump 41 continuously from when the urea water starts solidifying until when the urea water completes solidifying, in a continuous driving mode. When the ambient temperature TAM detected by the ambient temperature sensor 51 is lower than the eutectic point EUT and the urea water may solidify rapidly, the agitation control portion drives the urea water pump 41 continuously in the continuous driving mode. Thus, a generation of the concentration separation can be restricted.

Based on whether a driving torque of the urea water pump 41 becomes greater than a specified value, it may be determined whether all of the urea water in the storage tank 4 has solidified. The driving torque of the urea water pump 41 is measured based on an electric current value flowing through the urea water tank 41. The electric current value is detected with a detecting circuit, such as a shunt resistance.

It may be determined whether all of the urea water in the storage tank 4 has solidified based on a detection value of the urea water pressure sensor 52 provided to the urea water supply pipe 31.

The urea water pump 41 may have a plurality of suction ports 411.

The ECU 10 may be configured by a plurality of integrated circuits (ICs). In the above embodiments, the urea water is operated to agitate the urea water during whole period in which the urea water radiates the latent heat of solidification at the eutectic point EUT. Meanwhile, the urea water may be operated to agitate the urea water during a part of period in which the urea water radiates the latent heat of solidification at the eutectic point EUT.

The urea water pump 41 may be operated to agitate the urea water in the continuous operation mode during whole period in which the urea water radiates the latent heat of solidification at the eutectic point EUT.

The present embodiment can be applied to an exhaust gas purifying device 100 for other than a vehicle. While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A urea water agitation control device for an exhaust gas purifying device which supplies a urea water into an exhaust gas, the urea water agitation control device comprising:
 a controller including a computer processor for executing instructions such that the controller is at least configured to control a pump agitating the urea water stored in a storage tank; and
 a temperature sensor configured to detect a temperature of the urea water, wherein
 the controller is configured to operate the pump in a specified period which includes at least a part of a period in which a urea water temperature detected by the temperature sensor is kept at an eutectic point and the urea water temperature detected by the temperature sensor is higher than an ambient temperature so that the urea water radiates a latent heat of solidification.

2. A urea water agitation control device according to claim 1, wherein
 the controller is configured to operate pump also in a period during which the urea water temperature is falling from a specified temperature to the eutectic point.

3. A urea water agitation control device according to claim 1, wherein
 the exhaust gas purifying device purifies an exhaust gas emitted from an internal combustion engine,
 the controller is configured to control an operation of a heater heating the urea water, and
 the controller is configured to deenergize the heater when the internal combustion engine is off.

4. A urea water agitation control device according to claim 3, wherein
 the controller is configured to energize the heater when the internal combustion engine is off according to an idle reduction control.

5. A urea water agitation control device according to claim 1, wherein
 the controller is configured to intermittently operate the pump in an intermittent mode while the urea water temperature detected by the temperature sensor is kept at a eutectic point and the urea water radiates a latent heat of solidification.

6. A urea water agitation control device according to claim 5, wherein
 the controller is configured to operate the pump longer in the intermittent mode as an ambient temperature is lower.

7. A urea water agitation control device according to claim 5, wherein
 an controller is configured to operate the pump in the intermittent mode during a whole period in which the urea water temperature detected by the temperature sensor is kept at the eutectic point and the urea water radiates the latent heat of solidification.

8. A urea water agitation control device according to claim 1, wherein
 the pump is configured to discharge air bubbles into the urea water in order to agitate the urea water, and
 the controller is configured to control the pump so that the pump discharges the air bubbles during the specified period.

9. A urea water agitation control device according to claim 1, wherein the pump is configured to suction the urea water from the storage tank and discharge the urea water into the storage tank in order to agitate the urea water, and the controller is configured to control the pump so that the pump discharges the urea water during the specified period.

10. A urea water agitation control device according to claim 9, wherein the urea water agitation control device further comprises a urea water supply pipe for introducing the urea water from the storage tank to an injection valve injecting the urea water into the exhaust gas, the pump is configured to suction the urea water from the storage tank and supplying the urea water into the urea water supply pipe, and the urea water agitation control device further comprises a discharge pipe for introducing a part of the urea water flowing through the urea water supply pipe into the storage tank, and the controller is configured to control the pump so that the urea water pump suctions the urea water and discharges the urea water into the urea water supply pipe, whereby the urea water flows out from the storage tank and returns to the storage tank through the urea water supply pipe and the discharge pipe in order to agitate the urea water in the storage tank.

11. A urea water agitation control device according to claim 1, wherein the controller is configured to prohibit the pump from agitating the urea water when an amount of the urea water in the storage tank is not greater than a specified amount.

12. A urea water agitation control device according to claim 1, wherein the controller is configured to vary a threshold value of the urea water temperature, at which the pump starts an agitation operation, in accordance with a urea water concentration.

13. A urea water agitation control device according to claim 1, wherein the controller is configured to vary varies a threshold value of the urea water temperature, at which the pump starts an agitation operation, in accordance with the ambient temperature.

14. A urea water agitation control device for an exhaust gas purifying device which supplies a urea water into an exhaust gas, the urea water agitation control device comprising:

a controller including a computer processor for executing instructions for controlling a pump agitating the urea water stored in a storage tank, wherein the controller is configured to execute processing of:

acquiring a urea water temperature of the urea water and an ambient temperature; and operating the pump in a specified period which includes at least a part of a period in which the urea water temperature is kept at an eutectic point and higher than the ambient temperature.

15. A urea water agitation control device according to claim 14, wherein the controller is further configured to execute processing of:

varying a threshold value of the urea water temperature, at which the pump starts an agitation operation, in accordance with a urea water concentration.

16. A urea water agitation control device according to claim 14, wherein the controller is further configured to execute processing of:

varying a threshold value of the urea water temperature, at which the pump starts an agitation operation, in accordance with the ambient temperature.

* * * * *